US012642246B2

(12) United States Patent
Hoge et al.

(10) Patent No.: US 12,642,246 B2
(45) Date of Patent: Jun. 2, 2026

(54) LARGE COLLAPSIBLE ANIMAL CONTAINMENT ASSEMBLY

(71) Applicant: Diggs Inc., New York, NY (US)

(72) Inventors: Greg Hoge, Long Island City, NY (US); Courtney Armstrong, Long Island City, NY (US); Isaac Haverlick, Long Island City, NY (US)

(73) Assignee: Diggs Inc., New York, NY (US)

( * ) Notice: Subject to any disclaimer, the term of this patent is extended or adjusted under 35 U.S.C. 154(b) by 0 days.

(21) Appl. No.: 18/948,312

(22) Filed: Nov. 14, 2024

(65) Prior Publication Data

US 2025/0212837 A1 Jul. 3, 2025

Related U.S. Application Data

(63) Continuation of application No. 17/932,505, filed on Sep. 15, 2022, now Pat. No. 12,171,190.

(60) Provisional application No. 63/245,356, filed on Sep. 17, 2021.

(51) Int. Cl.
*A01K 1/02* (2006.01)
(52) U.S. Cl.
CPC .................................. *A01K 1/0245* (2013.01)
(58) Field of Classification Search
None
See application file for complete search history.

(56) References Cited

U.S. PATENT DOCUMENTS

| | | | |
|---|---|---|---|
| 2,538,778 A | 1/1951 | Halpin | |
| 4,484,540 A | 11/1984 | Yamamoto | |
| 4,590,885 A | 5/1986 | Sugiura | |
| 5,071,176 A | 12/1991 | Smith | |
| 5,307,758 A | 5/1994 | Ho | |
| 5,549,073 A | 8/1996 | Askins et al. | |
| 5,626,098 A | 5/1997 | Askins et al. | |
| 5,803,018 A | 9/1998 | Liou | |
| 5,967,090 A | 10/1999 | Hui | |
| 6,092,488 A | 7/2000 | Allawas | |
| 6,783,162 B1 | 8/2004 | Harper | |
| 6,863,030 B2 | 3/2005 | Axelrod | |
| 7,021,242 B2 | 4/2006 | Axelrod | |
| 8,127,719 B2 | 3/2012 | Jakubowski et al. | |
| 8,408,416 B2 * | 4/2013 | Cheng-Lung ............ | B65D 6/08 220/495 |
| 11,039,596 B2 | 6/2021 | Pan et al. | |
| 11,317,600 B2 * | 5/2022 | Huthmaker .............. | A01K 1/03 |
| 2005/0229866 A1 | 10/2005 | Simpson et al. | |

(Continued)

FOREIGN PATENT DOCUMENTS

| | | |
|---|---|---|
| CN | 208581664 U | 3/2019 |
| CN | 208581665 U | 3/2019 |

(Continued)

*Primary Examiner* — Joshua J Michener
*Assistant Examiner* — Henry Hooper Mudd
(74) *Attorney, Agent, or Firm* — Kenealy Vaidya LLP

(57) ABSTRACT

A collapsible pet crate that is easy to operate, aesthetically pleasing, quiet, light, durable, easy to clean, and safe and comfortable for the animal. Also disclosed herein are methods of operating a collapsible pet crate. The collapsible pet crate disclosed herein can further include one-step operation, environmentally safe and pet-friendly materials, and method to include various pet-friendly accessories.

18 Claims, 11 Drawing Sheets

(56)     References Cited

U.S. PATENT DOCUMENTS

| | | |
|---|---|---|
| 2007/0000447 A1 | 1/2007 | Jakubowski et al. |
| 2008/0121188 A1 | 5/2008 | Axelrod et al. |
| 2008/0245313 A1 | 10/2008 | Jakubowski et al. |
| 2010/0089336 A1 | 4/2010 | Flannery et al. |
| 2011/0041774 A1 | 2/2011 | Northrop et al. |
| 2012/0234252 A1 | 9/2012 | Donta et al. |
| 2014/0352628 A1 | 12/2014 | Kellogg |
| 2017/0118947 A1 | 5/2017 | Thoma et al. |
| 2021/0120778 A1* | 4/2021 | Prehogan ................. A01K 1/02 |

FOREIGN PATENT DOCUMENTS

| | | |
|---|---|---|
| CN | 113243301 A | 8/2021 |
| CN | 215302211 U | 12/2021 |
| CN | 215648706 U | 1/2022 |
| CN | 215648707 U | 1/2022 |
| CN | 113243301 B | 8/2022 |
| CN | 217657578 U | 10/2022 |
| CN | 218389237 U | 1/2023 |
| CN | 218389246 U | 1/2023 |
| CN | 218550910 U | 3/2023 |
| CN | 218550915 U | 3/2023 |
| CN | 218550916 U | 3/2023 |
| CN | 218571110 U | 3/2023 |
| CN | 219046994 U | 5/2023 |
| WO | 2018169693 A1 | 9/2018 |

* cited by examiner

100

410

510

520

910

920

930

LARGE COLLAPSIBLE ANIMAL CONTAINMENT ASSEMBLY

CROSS REFERENCE TO RELATED APPLICATIONS

This application is a continuation of U.S. Non-Provisional application Ser. No. 17/932,505 ("the '505 application"), filed on Sep. 15, 2022, entitled LARGE COLLAPSIBLE ANIMAL CONTAINMENT ASSEMBLY, which application is related to and claims priority benefits from U.S. Provisional Application Ser. No. 63/245,356 ("the '356 application"), filed on Sep. 17, 2021, entitled LARGE COLLAPSIBLE ANIMAL CONTAINMENT ASSEMBLY. The '505 and '356 applications are hereby incorporated in their entireties by this reference.

TECHNICAL FIELD

The present disclosure relates to the pet industry generally and more specifically to pet crates.

BACKGROUND

Conventional enclosures or crates for pets are often heavy, difficult to operate, rattling, constructed from cheap materials, unattractive. In addition to not being user-friendly, conventional pet enclosures are often disadvantageous for the pet because they may be difficult to clean and thus left dirty and access to the interior may be difficult. It can be desirable to produce a collapsible pet crate that is easy to operate, aesthetically pleasing, quiet, light, durable, easy to clean, and safe and comfortable for the animal.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments, a collapsible crate assembly includes a normally locked bi-functional handle, a retractable latch handle, a first side door, and a second side door.

In some embodiments, the normally locked bi-functional handle is biased to remain locked. In various embodiments, the retractable latch handle is configured to retain a bottom tray. In certain cases, the first side door and the second side door are configured to open from a bottom of the first side door and the second side door upward. In various aspects, the first side door and the second side door are configured to slide into the collapsible crate assembly after opening.

In various embodiments, a top of the collapsible crate assembly includes rollers configured to facilitate collapsing and deploying. In certain aspects, corners of the collapsible crate assembly include a first collapsible vertical member, a second collapsible vertical member, a third collapsible vertical member and a fourth collapsible vertical member. In various cases, the first collapsible vertical member, the second collapsible vertical member, the third collapsible vertical member and the fourth collapsible vertical member include tracks configured to guide the rollers. In some embodiments, the collapsible crate assembly includes a puppy divider. In some aspects, the puppy divider is deployed by placing the puppy divider into puppy divider slots.

According to certain embodiments, a collapsible crate assembly includes a support frame for supporting a mesh network in a deployed position, having a bottom, a top, a first collapsible side door, a second collapsible side door, a top, a collapsible front door, and a collapsible rear. The bottom includes a removable tray and the top includes a bi-functional handle and rollers configured to guide the top into a collapsed position. The collapsible front door and the collapsible rear includes tracks to engage the rollers. In certain aspects, the bi-functional handle includes an automatic lock. The first collapsible side door and the second collapsible side door may open in an upward and outward direction, and the first collapsible side door and the second collapsible side door may slide into an animal containment area after opening.

Various implementations described herein can include additional systems, methods, features, and advantages, which cannot necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The specification makes reference to the following appended figures, in which use of like reference numerals in different figures is intended to illustrate like or analogous components.

DETAILED DESCRIPTION

Certain aspects and features of the present disclosure relate to pet containment. The embodiments of the present disclosure described below are not intended to be exhaustive or to limit the disclosure to the precise forms described herein. Rather, the embodiments described herein are chosen so that a person of skill in the art can appreciate and understand the principles and practices of the present disclosure. Reference may be made herein to PCT Publication No. WO 2018/169693, entitled "Collapsible Animal Containment Assembly," which is incorporated herein by reference in its entirety.

As used herein, directional and spatial terms such as "horizontal," "vertical," "horizontally," "vertically," and "upward" are not intended to be binding terms.

Figure 1:
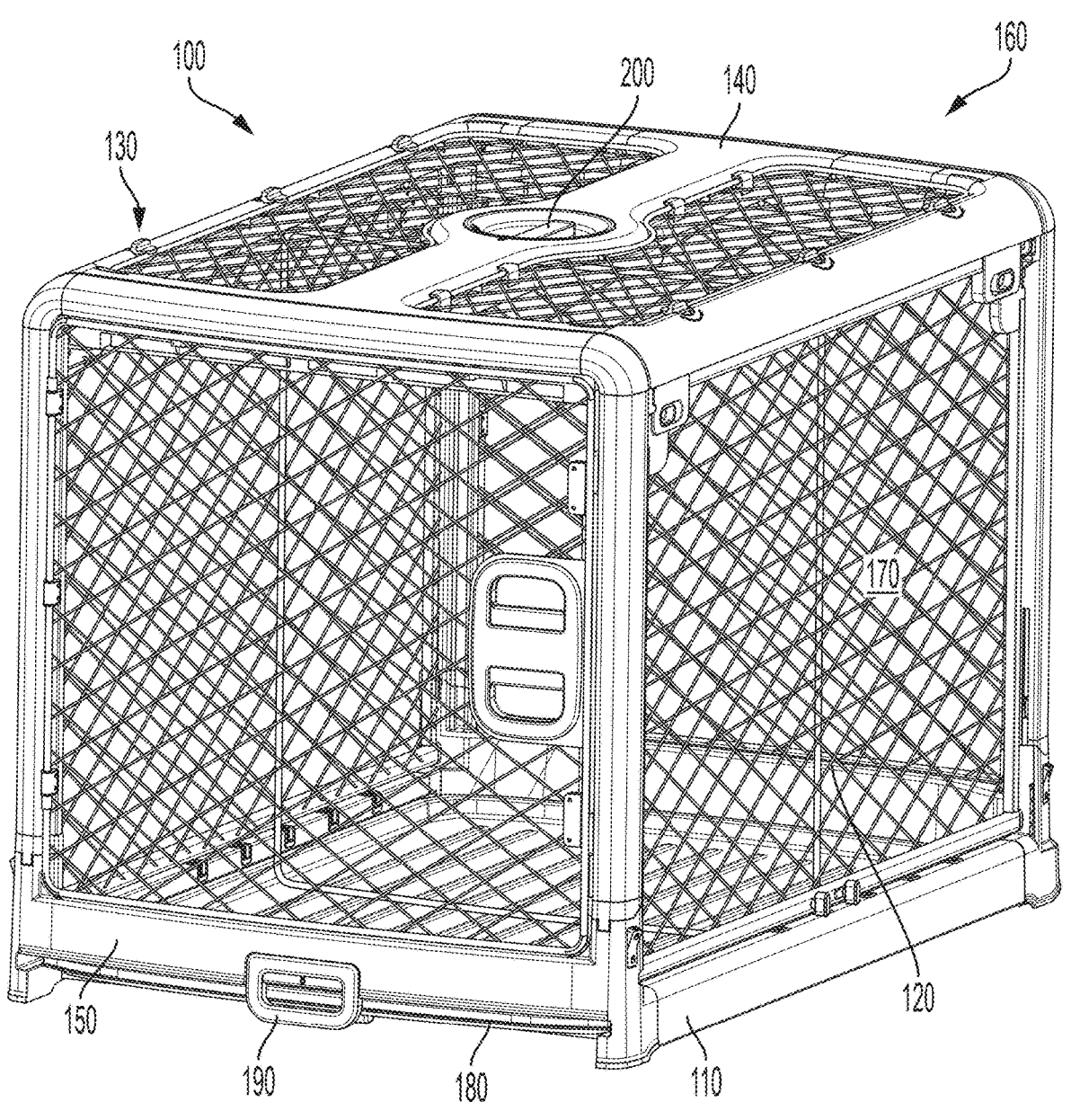
FIG. 1 is a front top perspective views of a collapsible crate assembly according to certain aspects of the present disclosure.

A collapsible crate assembly 100, according to certain embodiments of the present invention is presented in FIG. 1. In some embodiments, the collapsible crate assembly 100 comprises a bottom 110, a first collapsible side door 120, a second collapsible side door 130, a top 140, a collapsible front door 150, and a collapsible rear 160. A support frame is defined by four vertical members extending upward from the bottom 110. The support frame is employed to support a mesh network 170 forming an enclosure of the collapsible crate assembly 100. The mesh network 170 may include rectangular openings, rounded openings, or any other appropriate shape.

Figure 10A:
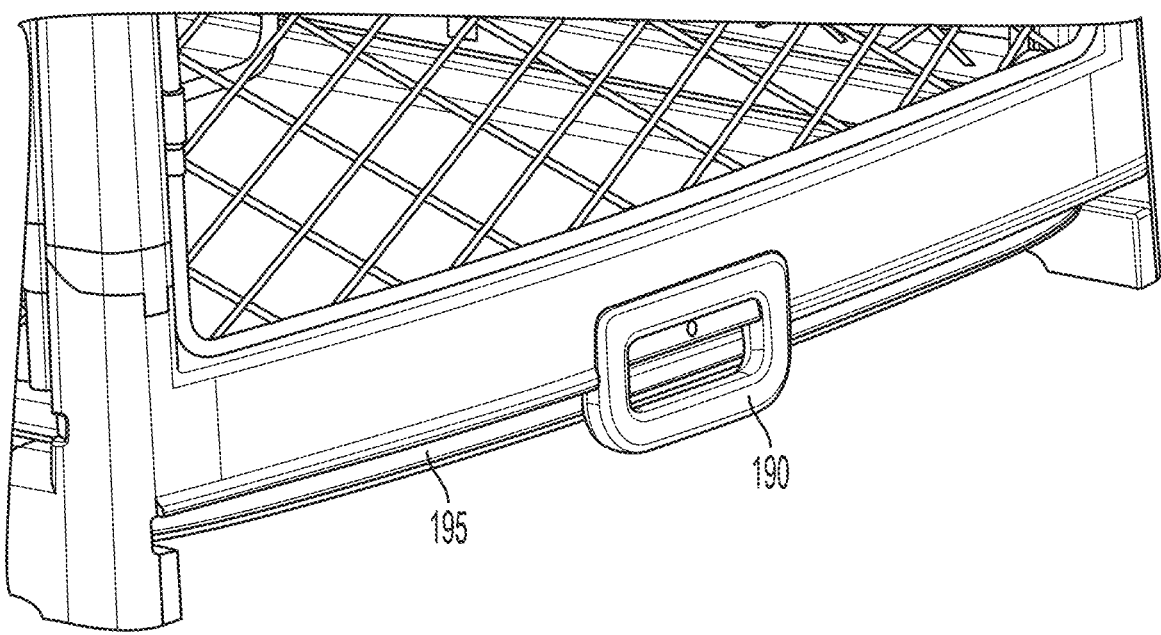
FIG. 10A is a perspective view of a handle of a collapsible crate assembly in a locked position according to certain aspects described herein.
Figure 10B:
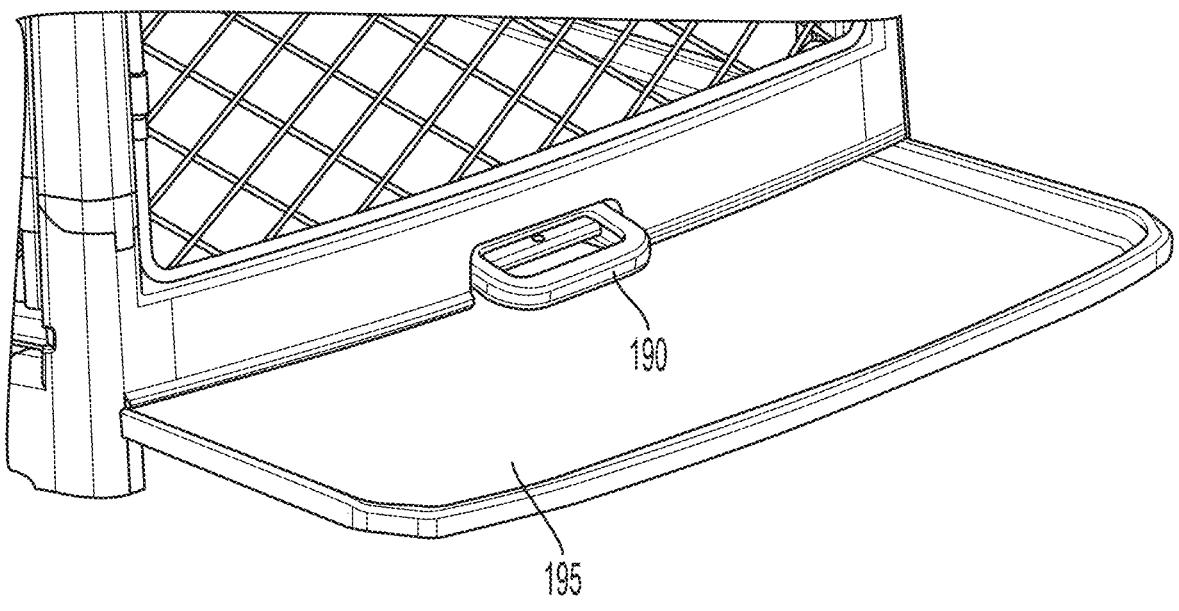
FIG. 10B is a perspective view of a handle of a collapsible crate assembly in an open position according to certain aspects described herein.

In some examples, the collapsible crate assembly 100 includes a tray slot 180. The tray slot 180 includes a retractable latch handle 190 capable of holding a tray 195 within the crate assembly 100. In some embodiments, the retractable latch handle 190 is arranged within a recess of the bottom 110 or the collapsible front door 150. The retractable latch handle 190 can be biased to remain in a normally closed and/or locked position. A normally closed and/or locked position is shown in FIGS. 1 and 10A. As such, when the retractable latch handle 190 is in the normally closed and/or locked position, the tray 195 cannot be removed from the crate assembly 100. When the crate assembly 100 is in a deployed position, the retractable latch handle 190 can be opened by a user pulling on the retractable latch handle 190 to move the retractable latch handle 190 to the open and/or unlocked position as shown in FIG. 10B. The opened retractable latch handle 190 allows the tray 195 to be removed from the crate assembly 100. The retractable latch handle 190 is biased to return to the normally closed and/or locked position when the user releases the retractable latch handle 190.

Figure 3:
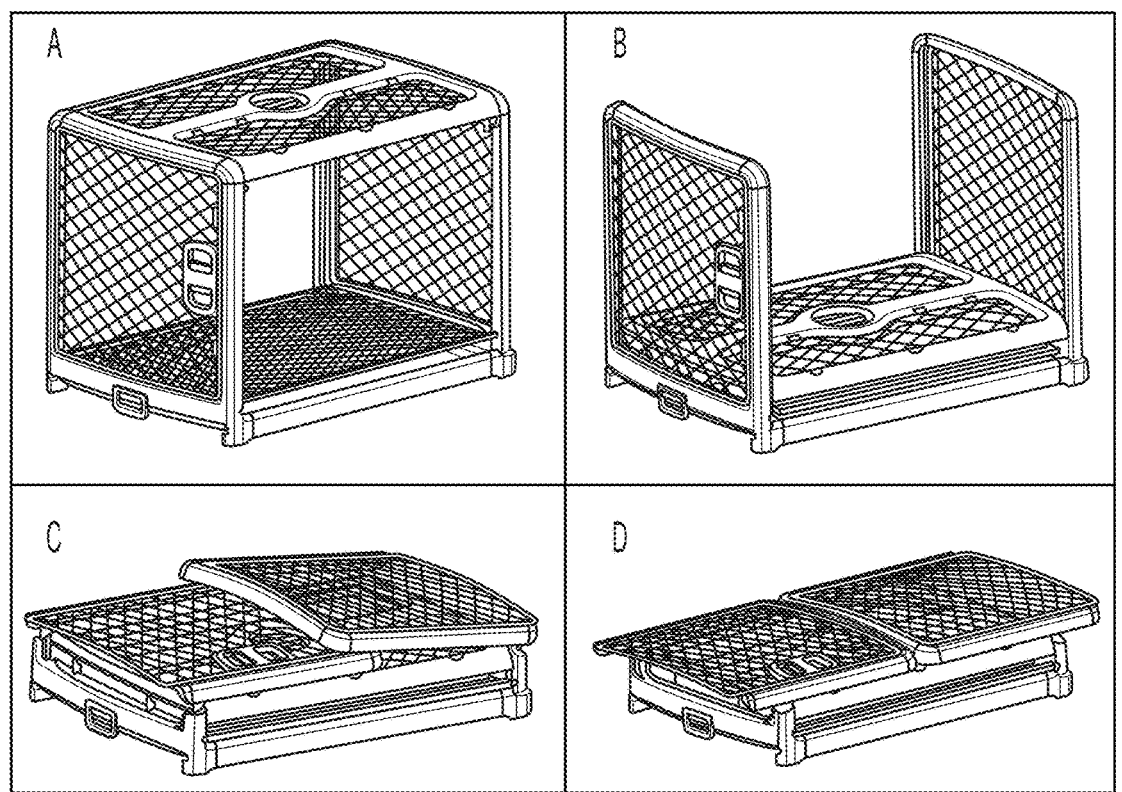
FIG. 3 is a collection of perspective views of the collapsible crate assembly of FIG. 1 according to certain aspects of the present disclosure.
Figure 4:
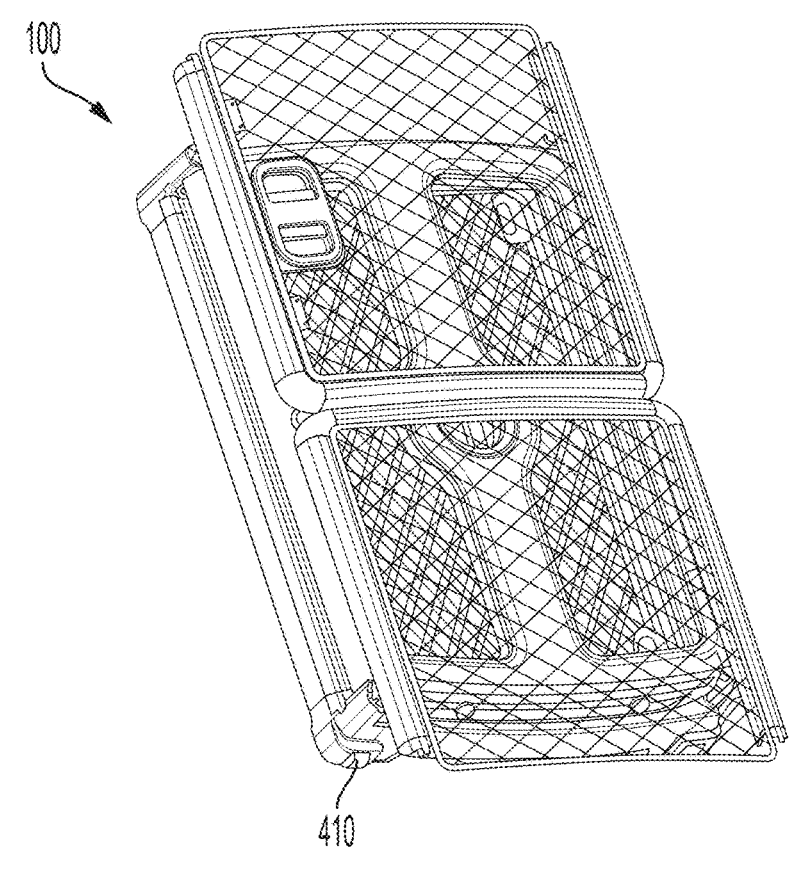
FIG. 4 is a perspective view of a collapsible crate assembly in a collapsed position according to certain aspects of the present disclosure.

When in the collapsed position, as shown in Panels C and D of FIG. 3 as well as FIG. 4, the retractable latch handle 190 is a handle provided for transporting the crate assembly 100. The arrangement of the retractable latch handle 190 may provide an ergonomic grip for the user while the user moves the collapsible crate assembly 100. A user can grasp the retractable latch handle 190 and lift one end of the crate assembly 100. Lifting one end of the crate assembly 100 allows wheels 410 (see FIG. 4) to engage the ground, thus enabling the crate assembly 100 to be transported.

The wheels 410 have a diameter of from about 30 mm to about 40 mm (e.g., from about 31 mm to about 49 mm, from about 30 mm to about 39 mm, from about 31 mm to about 40 mm, from about 32 mm to about 37 mm, or from about 31 mm to about 37 mm). The wheels 410 can have a width of from about 30 mm to about 60 mm (e.g., from about 31 mm to about 59 mm, from about 30 mm to about 59 mm, from about 31 mm to about 60 mm, from about 33 mm to about 55 mm, or from about 32 mm to about 58 mm). For example, the wheels 410 can have a diameter of 34 mm and a width of 55 mm to facilitate transporting the crate assembly 100 in either the deployed or the collapsed position.

Figure 2:
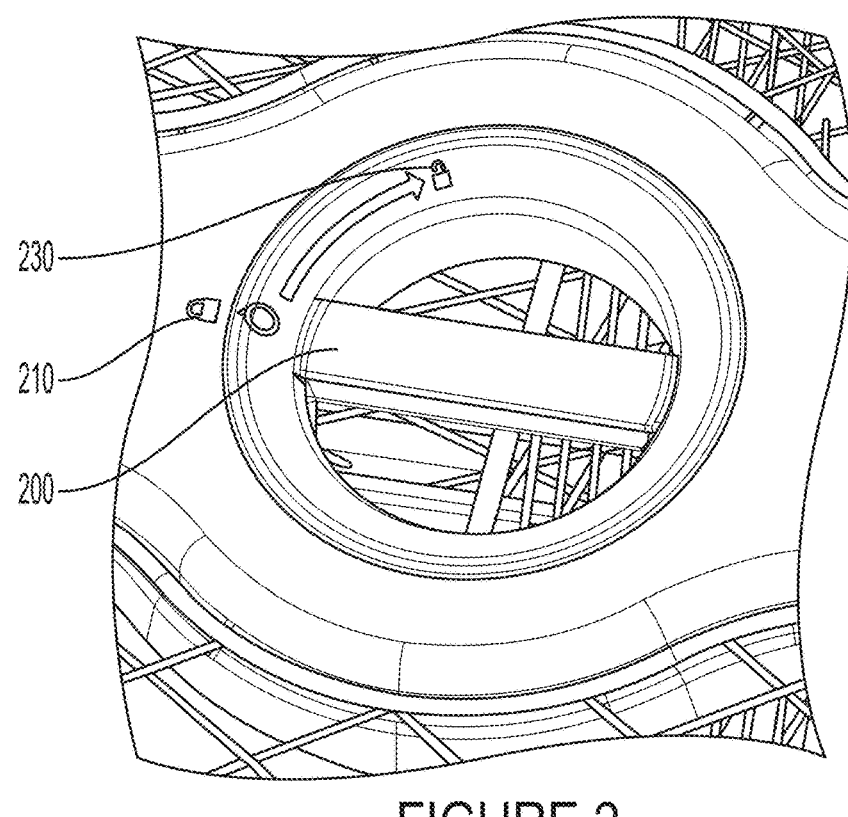
FIG. 2 is a top view of a bi-functional handle of the collapsible crate assembly of FIG. 1.

Referring to FIG. 2, a bi-functional handle 200 may be disposed within the top of the collapsible crate assembly 100. The bi-functional handle 200 enables a user to carry the collapsible crate assembly 100 when the collapsible crate assembly 100 is in the deployed position and to collapse the collapsible crate assembly 100 from the deployed position by moving and/or rotating the bi-functional handle 200. In some examples, the bi-functional handle 200 can rotate in either direction (clockwise or counter-clockwise) to allow the collapsible crate assembly 100 to move to the collapsed position. In other examples, the bi-functional handle 200 can only rotate in one direction (clockwise or counter-clockwise) to allow the collapsible crate assembly 100 to move to the collapsed position. In some examples, bi-functional handle 200 is completely enclosed within the top to prevent foreign objects from interfering with or damaging the mechanism.

The bi-functional handle 200 may include one or more springs and/or detents to bias the handle toward one or more positions, e.g., a normally locked position, an unlocked position, etc. In some examples, the bi-functional handle 200 includes a locking feature to secure the collapsible crate assembly 100 in the deployed position to prevent unintended or inadvertent collapsing of the collapsible crate assembly 100, as discussed in further detail below with respect to FIG. 6. The locking feature may couple the top 140 to an upper portion of the collapsible front door 150 and an upper portion of the collapsible rear 160 when the bi-functional handle 200 is in the normally locked position and the collapsible crate assembly 100 is in the deployed position. In the normally locked position while the collapsible crate assembly 100 is in the deployed position, the locking feature engages with the upper portion of the collapsible front door 150 and the upper portion of the collapsible rear 160 to couple the top 140 to the upper portion of the collapsible front door 150 and the upper portion of the collapsible rear 160.

The locking feature may couple the top 140 to a lower portion of the collapsible front door 150 and a lower portion of the collapsible rear 160 when the bi-functional handle 200 is in the normally locked position and the collapsible crate assembly 100 is in the collapsed position. In the normally locked position while the collapsible crate assembly 100 is in the collapsed position, the locking feature engages with the lower portion of the collapsible front door 150 and the lower portion of the collapsible rear 160 to couple the top 140 to the lower portion of the collapsible front door 150 and the lower portion of the collapsible rear 160.

The locking feature may decouple the top 140 from the upper portion of the collapsible front door 150 and the upper portion of the collapsible rear 160 when the bi-functional handle 200 is in the unlocked position and the collapsible crate assembly 100 is in the deployed position. In the unlocked position while the collapsible crate assembly 100 is in the deployed position, the locking feature disengages with the upper portion of the collapsible front door 150 and the upper portion of the collapsible rear 160 to decouple the top 140 from the upper portion of the collapsible front door 150 and the upper portion of the collapsible rear 160.

The locking feature may decouple the top 140 from the lower portion of the collapsible front door 150 and the lower portion of the collapsible rear 160 when the bi-functional handle 200 is in the unlocked position and the collapsible crate assembly 100 is in the deployed position. In the unlocked position while the collapsible crate assembly 100 is in the deployed position, the locking feature disengages with the lower portion of the collapsible front door 150 and the lower portion of the collapsible rear 160 to decouple the top 140 from the lower portion of the collapsible front door 150 and the lower portion of the collapsible rear 160.

In some embodiments, the bi-functional handle 200 can be an auto-locking bi-functional handle 200 as shown in FIG. 2. The auto-locking bi-functional handle 200 can be biased to remain in the normally locked position if a force is not applied to the auto-locking bi-functional handle 200, e.g., a rotational force. The normally locked position is shown in FIG. 2. As such, when the auto-locking bi-functional handle 200 is in the normally locked position, the collapsible crate assembly 100 cannot be collapsed or deployed. The auto-locking bi-functional handle 200 can be unlocked by a user applying a rotational force to rotate the auto-locking bi-functional handle 200 from a locked position to an unlocked position, e.g., rotating the auto-locking bi-functional handle 200 away from a lock icon 210 and toward an unlock icon 230, as shown in FIG. 2. The auto-locking bi-functional handle 200 being in the unlocked position allows the collapsible crate assembly 100 to be collapsed or deployed. The auto-locking bi-functional handle 200 is biased to return to the normally locked position when the user releases or stops applying the rotational force to the auto-locking bi-functional handle 200.

In some embodiments, moving the bi-functional handle 200 to the unlocked position releases the collapsible crate assembly 100 from the collapsed position and the deployed position. The collapsible crate assembly 100 may then be moved through intermediate positions between the collapsed position and the deployed position while the bi-functional handle 200 is in the unlocked position or the locked position. This may assist in the deployment or collapsing of the collapsible crate assemble 100 because the user may turn the bi-functional handle 200 to the unlocked position for a short period to release the collapsible crate assembly 100 from the collapsed position or the deployed position rather than maintaining the bi-functional handle 200 in the unlocked position for the entire movement from the collapsed position to the deployed position or vice versa.

A process flow of collapsing the collapsible crate assembly 100 is illustrated in Panels A-D of FIG. 3. Collapsing the collapsible crate assembly 100 includes collapsing the first side door 120 and the second side door 130 so the first side door 120 and the second side door 130 are positioned over the bottom 110, as shown in Panel A of FIG. 3. Rotating the bi-functional handle 200 to the unlock icon 230 and lowering the top 140 as shown in Panel B of FIG. 3. Collapsing the collapsible front door 150 and the collapsible rear 160 so the collapsible front door 150 and the collapsible rear 160 are positioned over the bottom 110, as shown in Panels C and D of FIG. 3. The collapsible front door 150 and the collapsible rear 160 can be configured to overlap as shown in FIG. 3 panel C. Optionally, the collapsible front door 150 and the collapsible rear 160 can be configured to lay flat in a butt-configuration as shown in FIG. 3 panel D. In certain aspects, the collapsed configuration of the collapsible front door 150 and the collapsible rear 160 can be chosen by a human user.

Figure 5:
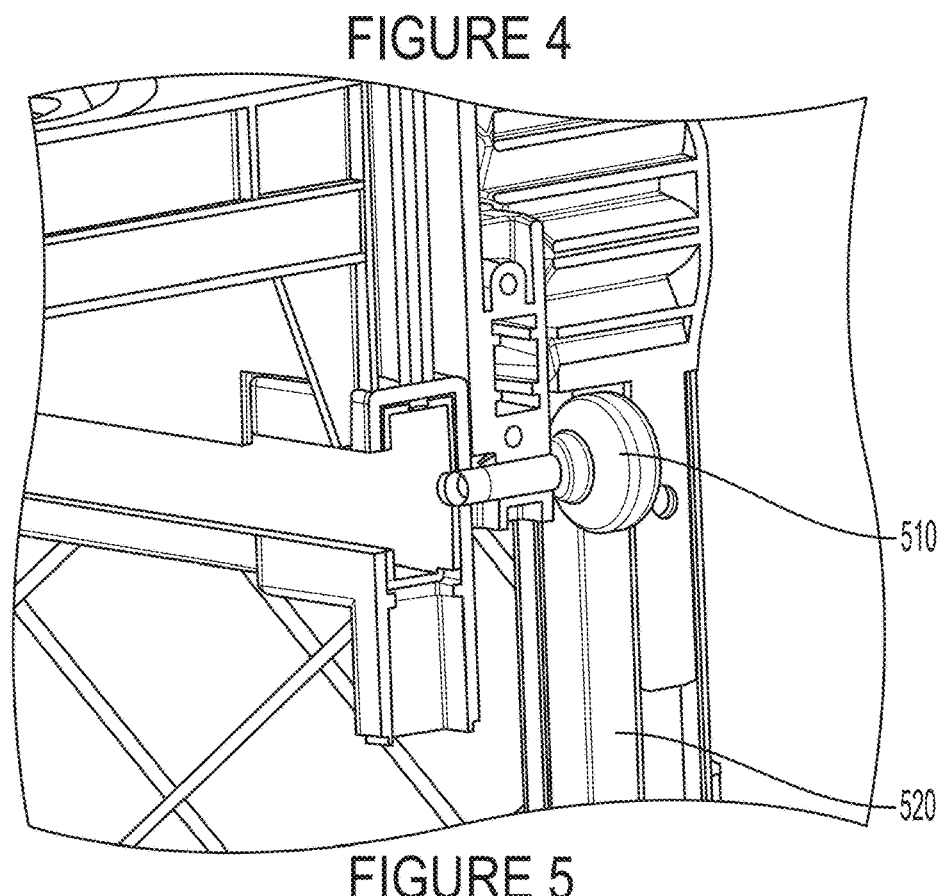
FIG. 5 is a cross-sectional view of the collapsible crate assembly of FIG. 1 according to certain aspects described herein.

Referring to FIG. 5, the top 140 can include rollers 510 configured to engage and travel in tracks 520 to facilitate collapsing and deploying of the crate assembly 100 as shown in FIG. 3. The tracks 520 can be disposed within the collapsible front door 150 and the collapsible rear 160. In some embodiments, each corner of the top 140 includes a roller 510 and each of the four vertical members extending upward from the bottom 110 includes a track 520. The rollers 510 and tracks 520 may assist in guiding the top 140 up and down between the collapsed position and deployed position.

The collapsible crate assembly 100 can be restored to the deployed position. The collapsible front door 150 and the collapsible rear 160 can be raised from collapsed positions exposing the collapsed top 140 as shown in Panel B of FIG. 3. The bi-functional handle 200 can be rotated to the unlock icon 230. The user can then raise the top 140. The bi-functional handle 200 can then be turned to the lock icon 220 to lock the top 140 in the deployed position as shown in Panel A of FIG. 3. The first side door 120 and the second side door 130 can then be raised into the deployed position.

Figure 6:
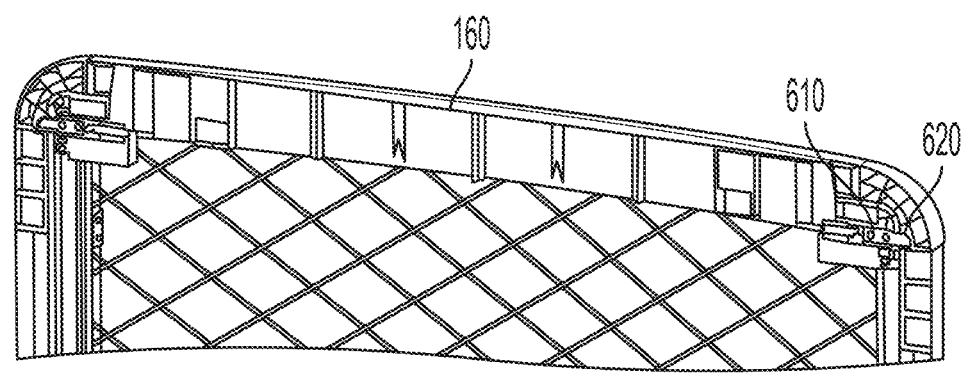
FIG. 6 is a cross-sectional view of the collapsible crate assembly of FIG. 1 according to certain aspects described herein.

In certain aspects, rotating the bi-functional handle 200 from a locked position to an unlocked position includes disengaging latch pins 610 extending from the top 140 into a latch pin receiver 620 disposed within the collapsible front door 150 and the collapsible rear 160 as shown in FIG. 6. Releasing the bi-functional handle 200 and/or purposefully rotating the bi-functional handle 200 to the locked position can allow the latch pins 610 to engage the latch pin receivers 620, thereby coupling the top to the collapsible front door 150 and the collapsible rear 160 via the latch pins 610 and maintaining the collapsible crate assembly 100 in the deployed position.

Figure 7:
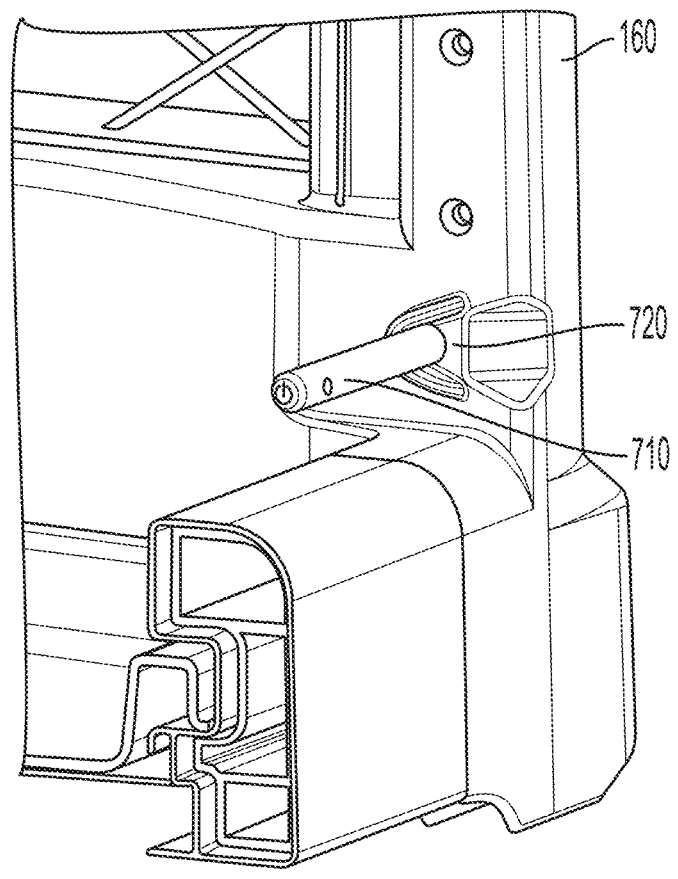
FIG. 7 is a cross-sectional view of the collapsible crate assembly of FIG. 1 according to certain aspects described herein.
Figure 11A:
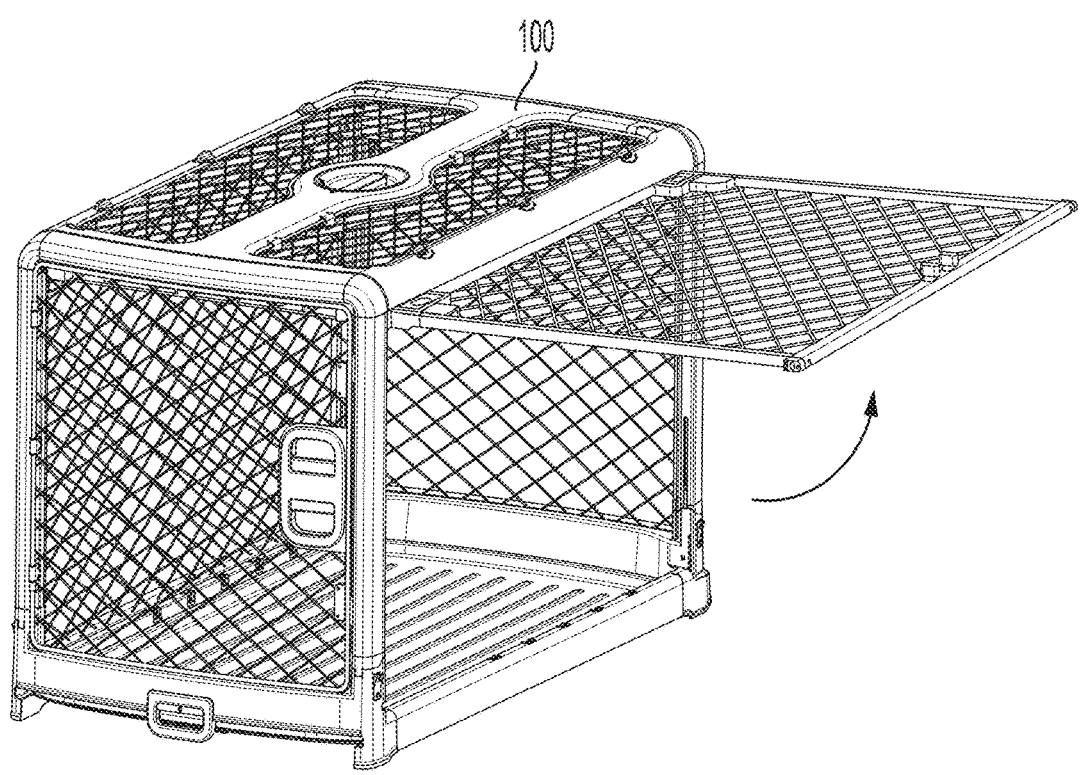
FIG. 11A-B is a perspective view of a collapsible crate assembly with a deployed side door according to certain aspects described herein.
Figure 11B:
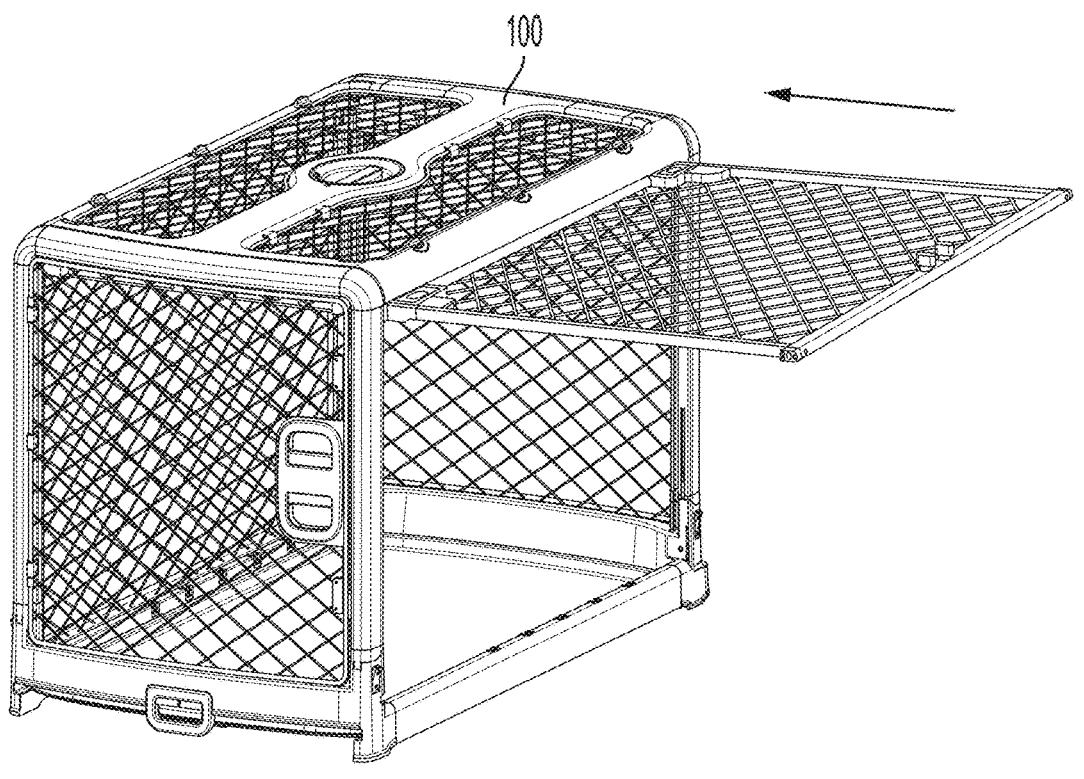

Referring to FIGS. 11A and 11B, optionally, the first side door 120 and/or the second side door 130 can be configured to open upward and outward. The first side door 120 and the second side door 130 can further be configured to slide into the animal containment area. In some cases, the first side door 120 and the second side door 130 can slide into the animal containment area adjacent to the top 140. For example, the first side door 120 and the second side door 130 can be configured to open upward and outward, as shown by the arrow in FIG. 11A, until the first side door 120 and/or the second side door 130 are substantially parallel to the top 140. The first side door 120 and/or the second side door 130 can then slide, as shown by the arrow in FIG. 11B, into the animal area of the collapsible crate assembly 100. In some examples, the first side door 120 and the second side door 130 function similarly to a rigid-body garage door. The first side door 120 and the second side door 130 can further be configured to latch into place when in a closed position. The first side door 120 and the second side door 130 can include side door latch pins 710 configured to engage side door latch slots 720 disposed within the collapsible front door 150 and the collapsible rear 160, as shown in FIG. 7.

Figure 12:
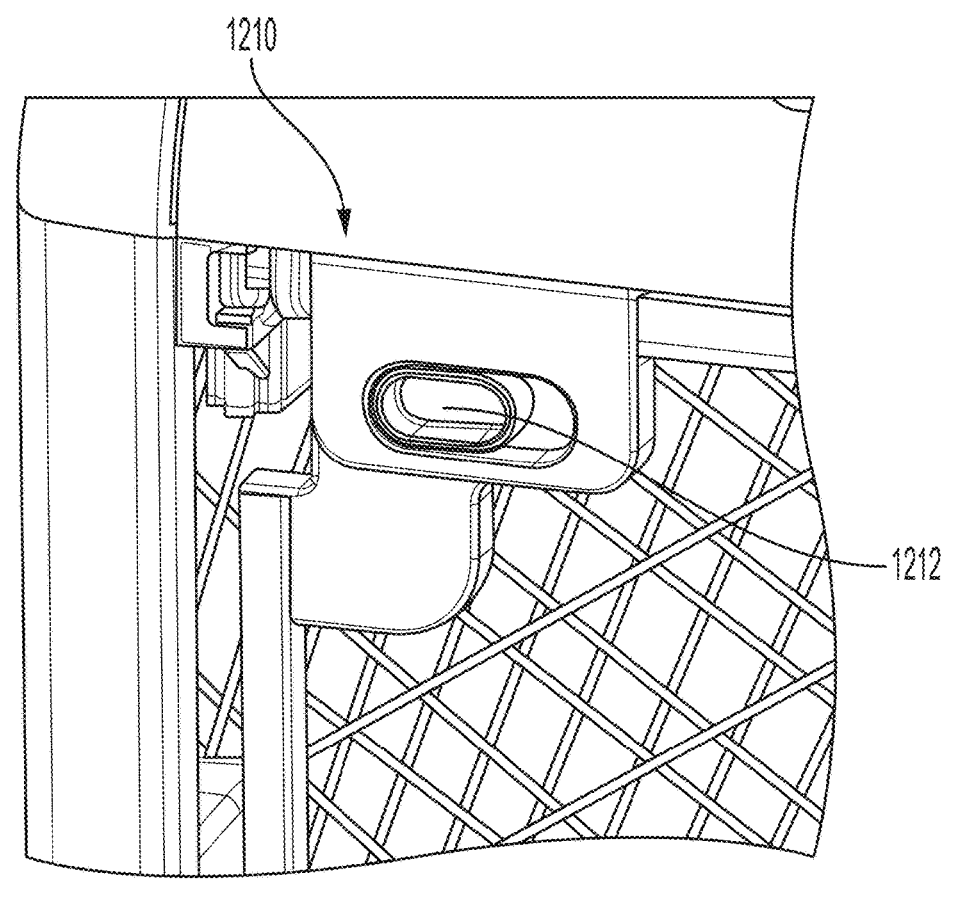
FIG. 12 is a schematic of a side door assembly according to certain aspects described herein.

In some embodiments, latch pin release mechanisms 1210 can be located at corners of the first side door 120 and the second side door 130. As shown in FIG. 12, a first corner latch pin release mechanism 1210 can be positioned adjacent to a latch pin receiver and operate as described previously. For example, the latch pin release mechanism 1210 may be spring loaded such that the latch pins of the latch pin release mechanism 1210 are normally engaged in the latch pin receivers to couple the first side door 120 and/or the second side door 130 to at least one of the collapsible front door 150 and the collapsible rear 160. The latch pin release mechanism 1210 may include a sliding member 1212 that may be moved to disengage the latch pins from the latch pin receivers allowing the first side door 12 and/or the second side door 130 to rotate to the collapsed position where the first side door 12 and/or the second side door 130 is positioned over the bottom 110.

A second corner latch pin release mechanism can be positioned at a second corner of the first side door 120 or the second side door 130, such that the first corner latch pin release mechanism 1210 and the second corner latch pin release mechanism are operated in concert to open the first side door 120 and the second side door 130. For example, the first corner latch pin release mechanism 1210 and the second corner latch pin release mechanism can be positioned at two top corners of the first side door 120 and/or the second side door 130, at two left corners of the first side door 120 and the second side door 130, at two right corners of the first side door 120 and the second side door 130, at two bottom corners of the first side door 120 and/or the second side door 130, or any suitable configuration.

Figure 8:
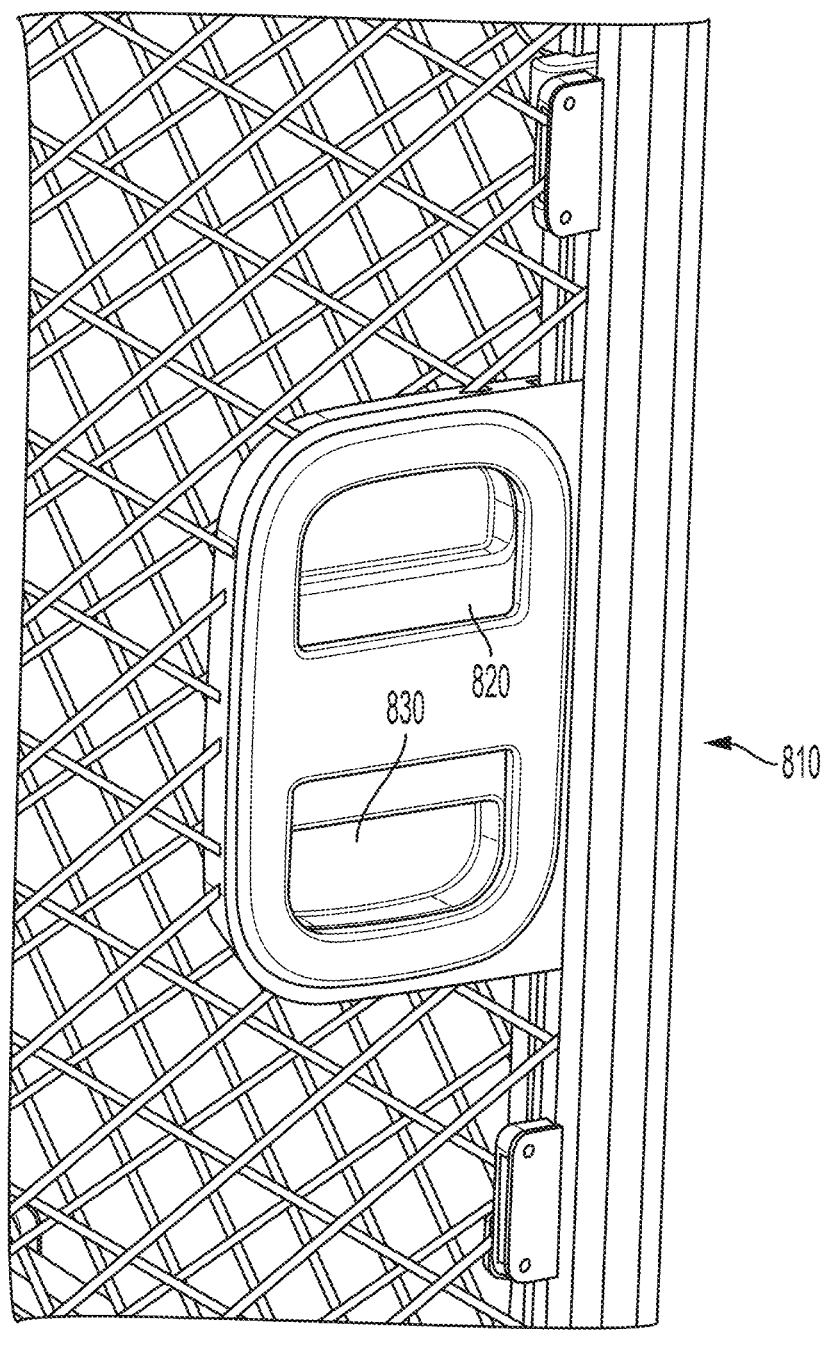
FIG. 8 is a front perspective close-up view of the collapsible crate assembly of FIG. 1 according to certain aspects described herein.

In certain embodiments, the collapsible front door 150 includes a latch pin release mechanism 810 that is a squeeze-activated latch pin release mechanism 810 as shown in FIG. 8. An optional rear door forming the rear 160 may also include the latch pin release mechanism 810. The squeeze-activated latch pin release mechanism 810 is spring loaded such that the latch pins are normally engaged with latch pin receivers, which are arranged in the top 140 and bottom 110, and a first squeeze-activated latch pin release handle 820 and a second squeeze-activated latch pin release handle 830 are in a non-compressed state. The squeeze-activated latch pin release mechanism 810 must be compressed such that the first squeeze-activated latch pin release handle 820 and the second squeeze-activated latch pin release handle 830 are compressed toward each other to disengage the latch pins from the latch pin receivers allowing the collapsible front door 150 and/or the optional rear door to be opened and allow an animal to enter and/or exit the collapsible crate assembly 100.

Figure 9:
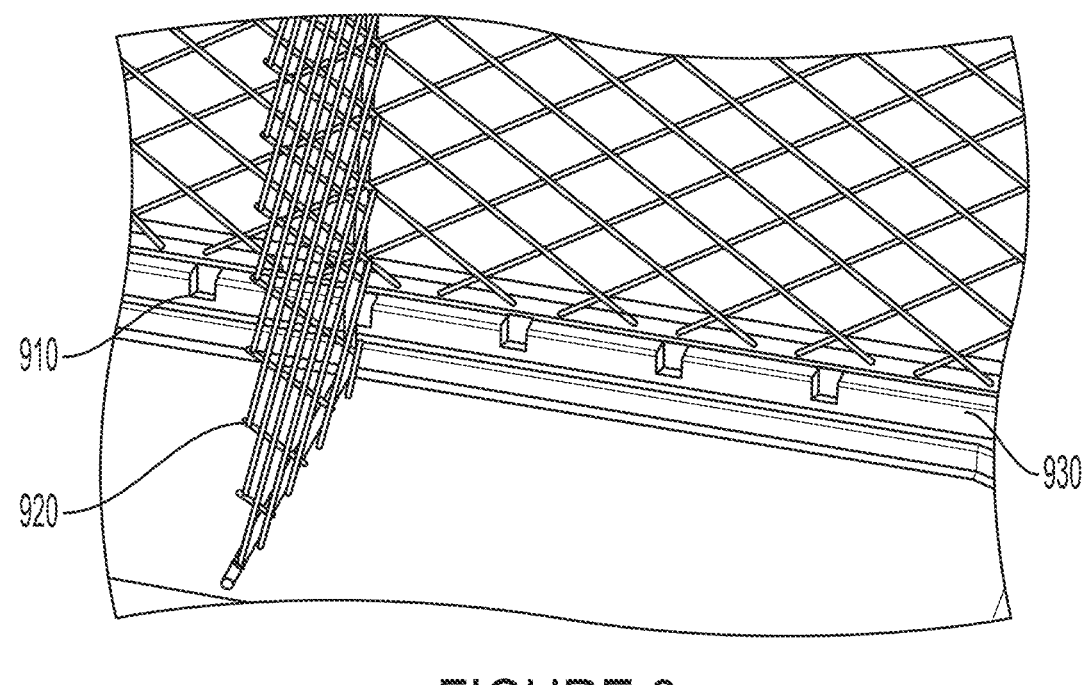
FIG. 9 is an interior view of the collapsible crate assembly of FIG. 1 according to certain aspects described herein.

Referring to FIG. 9, in some further embodiments, the collapsible crate assembly 100 can include slots 910 to facilitate placement of a puppy divider 920. The collapsible crate assembly 100 may include any suitable number of slots 910, e.g., one, two, three, four, five, six, seven, etc. The slots 910 can be disposed along a bottom frame 930 to support the puppy divider 920. The bottom frame 930 may be part of the bottom 110. The puppy divider 920 can be deployed in any suitable configuration to contain a puppy to a reduced-size portion of the collapsible crate assembly 100 to facilitate crate training. Optionally, the puppy divider 920 can be employed to contain and sequester at least two puppies in a single crate assembly 100. For example, employing one puppy divider 920 can sequester two puppies, employing two puppy dividers 920 can sequester three puppies, and so on, depending on a size and/or weight of each individual puppy.

Figure 13:
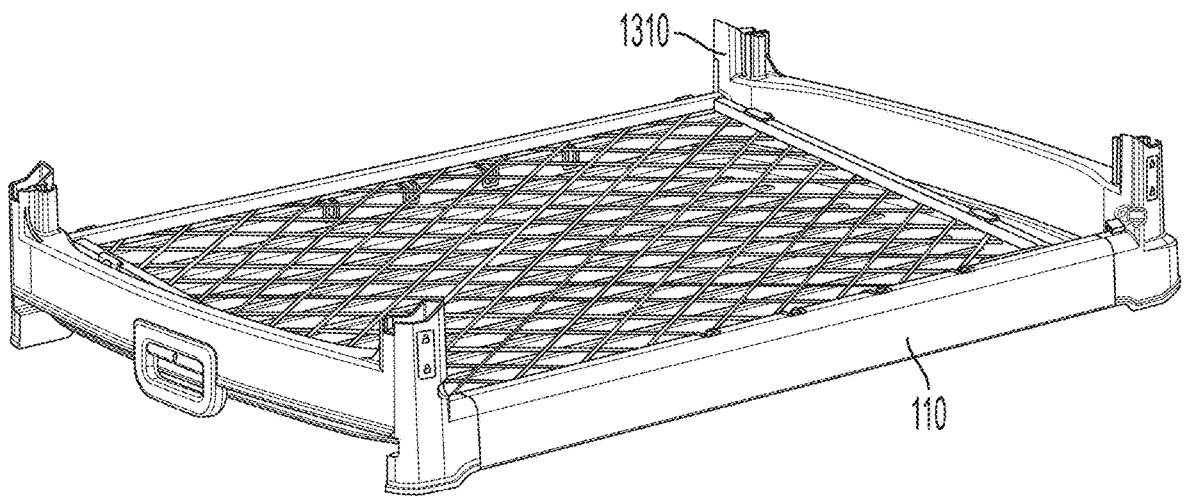
FIG. 13 is a perspective view of the bottom according to certain aspects described herein.
Figure 14A:
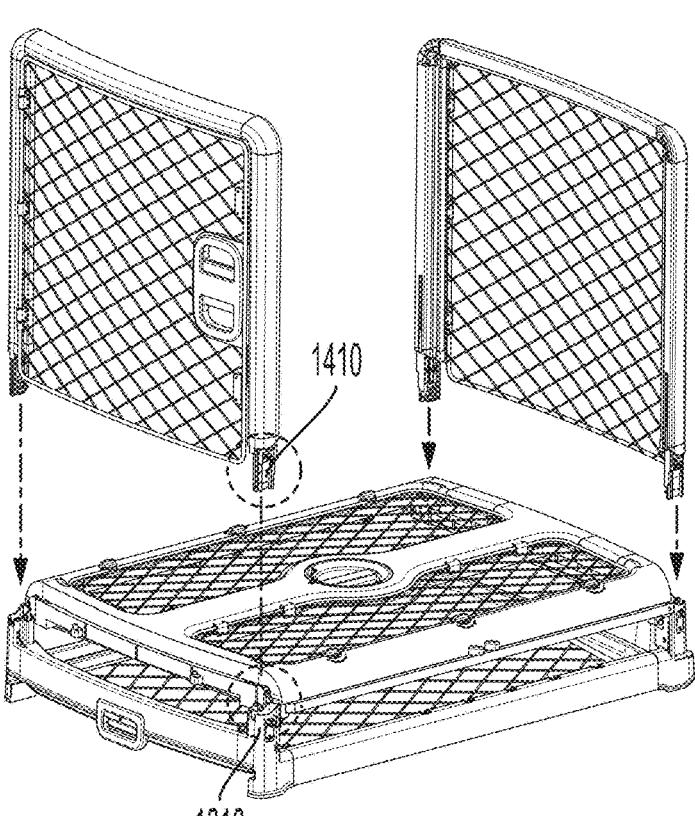
FIG. 14A-B is a perspective view of a collapsible crate assembly at varying assembly stages according to certain aspects described herein.
Figure 14B:
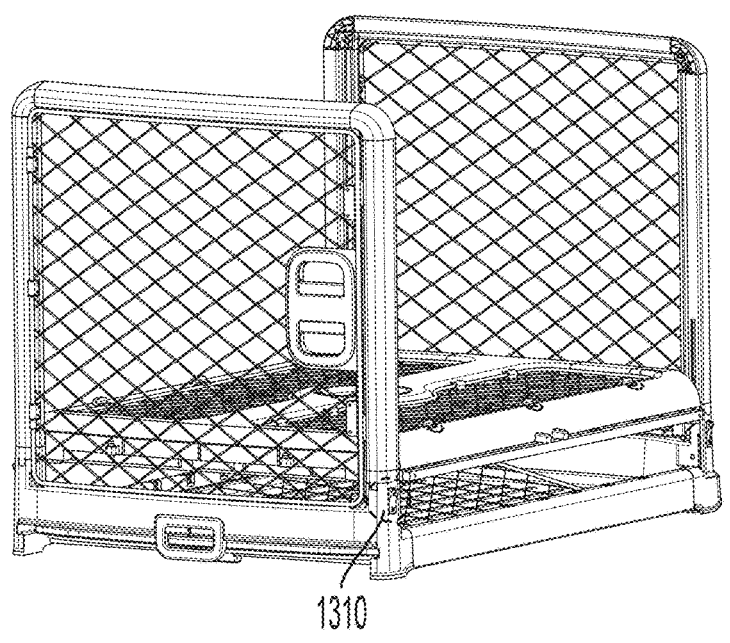

Referring to FIG. 13, the bottom 110 may include at least one receiving member 1310. In some embodiments, each corner of the bottom 110 has a receiving member 1310. The receiving member 1310 is configured to receive a vertical member of the collapsible crate assembly 100. As shown in FIGS. 14A-14B, a coupling portion 1410 of the vertical member may be inserted into the receiving member 1310 while assembling the collapsible crate assembly 100. The coupling portion 1410 may be removed from the receiving member 1310 while disassembling the collapsible crate assembly 100.

Figure 15:
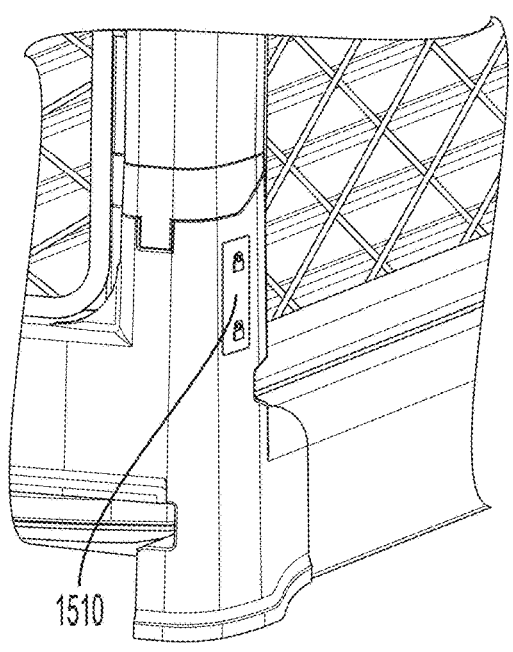
FIG. 15 is a partial perspective view of the locking mechanism according to certain aspects described herein.

In some embodiments, the receiving member 1310 includes a locking mechanism 1510 as shown in FIG. 15. In further embodiments, the locking mechanism 1510 may be arranged in the vertical member and or the coupling portion 1410 of the vertical member. The locking mechanism 1510 may be configured to lock the coupling portion 1410 within the receiving member 1310 so that the vertical members may not be removed from the bottom 110.

Figure 16:
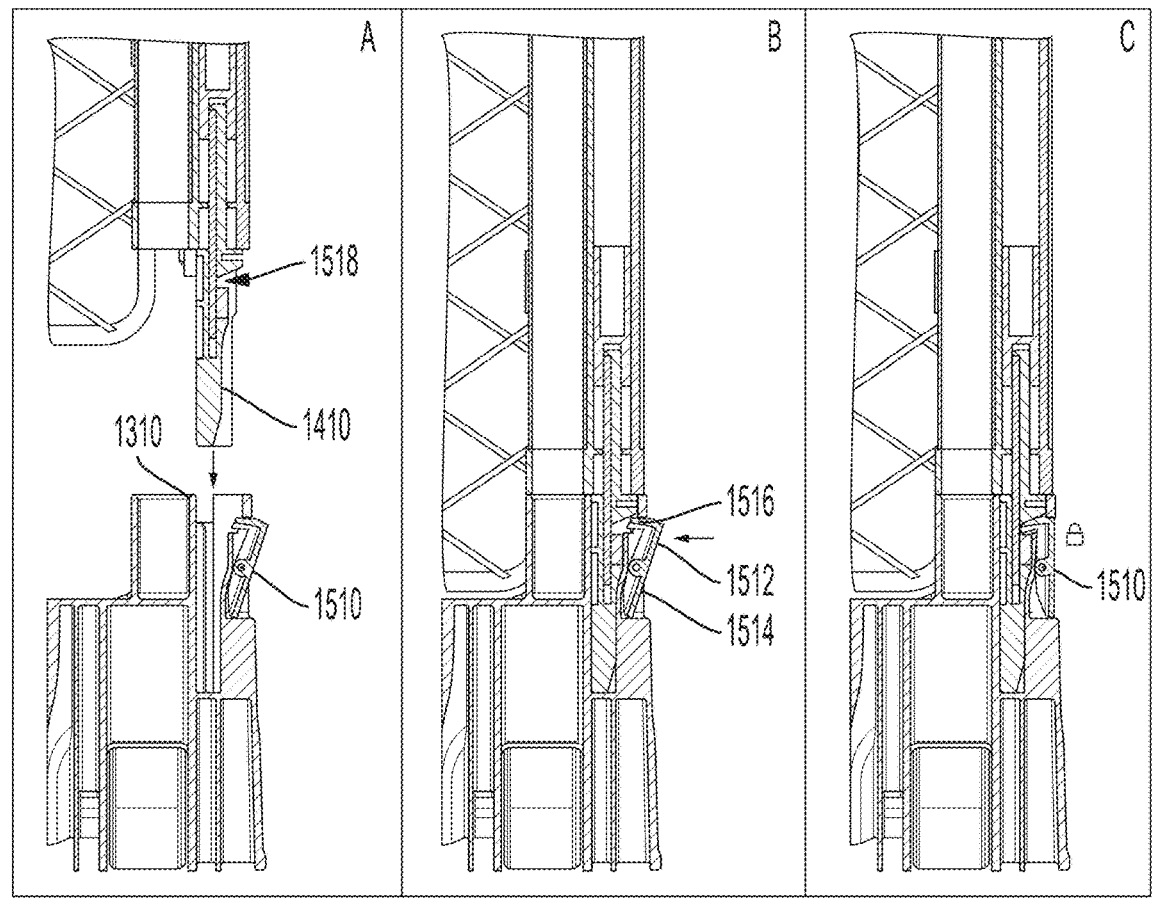
FIG. 16 is a collection of side cross-sectional views of the locking mechanism of FIG. 15 according to certain aspects described herein.

As shown in Panels A-C of FIG. 16, the locking mechanism 1510 may be a 2-position switch having a locked position and an unlocked position. In the unlocked position shown in Panel A of FIG. 16, the coupling portion 1410 may be inserted into the receiving member 1310. A user may press a lock side 1512 of the locking mechanism 1510, as shown in Panel B of FIG. 16 to move the locking mechanism 1510 from the unlocked position to the locked position. In the locked position shown in Panel C of FIG. 16, at least a portion 1516 of the locking mechanism 1510 may engage with a portion 1518 of the coupling portion 1410 to couple the vertical member to the receiving member 1310 and prevent the vertical member from being separated from the bottom 110. To unlock the locking mechanism 1510, the user may press an unlock side 1514 of the locking mechanism 1510 to disengage the portion of the locking mechanism 1510 from the portion of the coupling portion 1410.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative embodiments but, like the illustrative embodiments, should not be used to limit the present disclosure. The elements included in the illustrations herein may not be drawn to scale.

The foregoing description of the embodiments, including illustrated embodiments, has been presented only for the purpose of illustration and description and is not intended to be exhaustive or limiting to the precise forms disclosed. Numerous modifications, adaptations, and uses thereof will be apparent to those skilled in the art. In the following, further examples are described to facilitate understanding of aspects of the invention:

Example 1. A collapsible crate assembly (which may incorporate features of any of the subsequent examples), comprising: a normally locked bi-functional handle; a retractable latch handle; a first side door; and a second side door.

Example 2. The collapsible crate assembly of Example(s) 1 or any preceding or subsequent example(s) or combination of examples, wherein the normally locked bi-functional handle is biased to remain locked.

Example 3. The collapsible crate assembly of Example(s) 1 or any preceding or subsequent example(s) or combination of examples, wherein the retractable latch handle is configured to retain a bottom tray.

Example 4. The collapsible crate assembly of Example(s) 1 or any preceding or subsequent example(s) or combination of examples, wherein the first side door and the second side door are configured to open from a bottom of the first side door and the second side door upward.

Example 5. The collapsible crate assembly of Example(s) 4 or any preceding or subsequent example(s) or combination of examples, wherein the first side door and the second side door are configured to slide into the collapsible crate assembly after opening.

Example 6. The collapsible crate assembly of Example(s) 1 or any preceding or subsequent example(s) or combination of examples, wherein a top of the collapsible crate assembly comprises rollers configured to facilitate collapsing and deploying.

Example 7. The collapsible crate assembly of Example(s) 6 or any preceding or subsequent example(s) or combination of examples, wherein corners of the collapsible crate assembly comprise a first collapsible vertical member, a second collapsible vertical member, a third collapsible vertical member and a fourth collapsible vertical member.

Example 8. The collapsible crate assembly of Example(s) 7 or any preceding or subsequent example(s) or combination of examples, wherein the first collapsible vertical member, the second collapsible vertical member, the third collapsible vertical member and the fourth collapsible vertical member comprise tracks configured to guide the rollers.

Example 9. The collapsible crate assembly of Example(s) 1 or any preceding or subsequent example(s) or combination of examples, wherein corners of the collapsible crate assembly comprise a first collapsible vertical member, a second collapsible vertical member, a third collapsible vertical member and a fourth collapsible vertical member that are each coupleable to a bottom of the collapsible crate assembly using a respective locking mechanism.

Example 10. The collapsible crate assembly of Example(s) 1 or any preceding or subsequent example(s) or combination of examples, wherein the locking mechanism comprises a two-position switch, and wherein a locked position of the two-position switch engages a portion of the locking mechanism with the respective first collapsible vertical member, second collapsible vertical member, third collapsible vertical member or fourth collapsible vertical member.

Example 11. A collapsible crate assembly (which may incorporate features of any of the preceding or subsequent examples), comprising: a support frame for supporting a mesh network in a deployed position, having a bottom, a top, a first collapsible side door, a second collapsible side door, a collapsible front door, and a collapsible rear, wherein the bottom comprises a removable tray, wherein the top comprises a bi-functional handle and rollers configured to guide the top into a collapsed position, wherein the collapsible front door and the collapsible rear comprise tracks to engage the rollers, wherein the bi-functional handle comprises an automatic lock, wherein the first collapsible side door and the second collapsible side door are configured to open in an upward and outward direction, and wherein the first collapsible side door and the second collapsible side door are configured to slide into an animal containment area after opening.

Example 12. The collapsible crate assembly of Example(s) 11 or any preceding or subsequent example(s) or combination of examples, wherein the bottom comprises a retractable latch handle.

Example 13. The collapsible crate assembly of Example(s) 12 or any preceding or subsequent example(s) or combination of examples, wherein the retractable latch handle is configured to retain a bottom tray.

Example 14. The collapsible crate assembly of Example(s) 11 or any preceding or subsequent example(s) or combination of examples, wherein a locked position of the bi-functional handle couples the top to the collapsible front door and the collapsible rear.

Example 15. The collapsible crate assembly of Example(s) 14 or any preceding or subsequent example(s) or combination of examples, wherein, in the locked position of the bi-functional handle, a portion of the top engages with a portion of the collapsible front door and a portion of the collapsible rear.

Example 16. The collapsible crate assembly of Example(s) 11 or any preceding or subsequent example(s) or combination of examples, further comprising a puppy divider deployable by placing the puppy divider into puppy divider slots.

Example 17. The collapsible crate assembly of Example(s) 11 or any preceding or subsequent example(s) or combination of examples, wherein corners of the collapsible crate assembly comprise a first collapsible vertical member, a second collapsible vertical member, a third collapsible vertical member and a fourth collapsible vertical member that are each coupleable to the bottom using a respective locking mechanism.

Example 18. The collapsible crate assembly of Example(s) 17 or any preceding or subsequent example(s) or combination of examples, wherein the locking mechanism comprises a two-position switch, and wherein a locked position of the two-position switch engages a portion of the locking mechanism with the respective first collapsible vertical member, second collapsible vertical member, third collapsible vertical member or fourth collapsible vertical member.

Example 19. The collapsible crate assembly of Example(s) 18 or any preceding or subsequent example(s) or combination of examples, wherein the unlocked position of the two-position switch permits the removal of the respective first collapsible vertical member, second collapsible vertical member, third collapsible vertical member or fourth collapsible vertical member from the bottom.

Example 20. The collapsible crate assembly of Example(s) 11 or any preceding or subsequent example(s) or combination of examples, wherein the first collapsible side door and the second collapsible side door comprise at least one latch pin release mechanism arranged in at least one corner of the first collapsible side door and the second collapsible side door, wherein the at least one latch pin release mechanism is coupleable to at least one of the collapsible front door or the collapsible rear.

11

12

What is claimed is:

1. A collapsible crate assembly, comprising:
a bottom, a top, a first side wall, a second side wall, a front wall, and a rear wall; and
a handle disposed within the top;
wherein the top comprises a moving mechanism configured to facilitate moving the top between a deployed position and a collapsed position,
wherein corners of the collapsible crate assembly comprise a first vertical member, a second vertical member, a third vertical member, and a fourth vertical member, and
wherein the first vertical member, the second vertical member, the third vertical member, and the fourth vertical member each comprise a track configured to guide the moving mechanism.

2. The collapsible crate assembly of claim 1, wherein the handle is movable between a locked position and an unlocked position, and wherein in the unlocked position the top is movable between the deployed position and the collapsed position.

3. The collapsible crate assembly of claim 1, wherein the bottom comprises a retractable latch handle configured to retain a bottom tray.

4. The collapsible crate assembly of claim 1, wherein the first side wall and the second side wall are configured to open from a bottom of the first side wall and the second side wall upward and are configured to slide into the collapsible crate assembly after opening.

5. The collapsible crate assembly of claim 1, wherein the first vertical member, the second vertical member, the third vertical member, and the fourth vertical member are each coupleable to the bottom using a respective locking mechanism.

6. The collapsible crate assembly of claim 5, wherein the respective locking mechanism comprises a two-position switch, and wherein a locked position of the two-position switch engages a portion of the respective locking mechanism with the respective first vertical member, second vertical member, third vertical member, or fourth vertical member.

7. The collapsible crate assembly of claim 6, wherein an unlocked position of the two-position switch permits the removal of the respective first vertical member, second vertical member, third vertical member, or fourth vertical member from the bottom.

8. A collapsible crate assembly, comprising:
a bottom, a top, a first collapsible side wall, a second collapsible side wall, a collapsible front wall, and a collapsible rear wall;
wherein the top comprises rollers configured to guide the top between a deployed position and a collapsed position;
wherein the collapsible front wall and the collapsible rear wall comprise tracks to engage the rollers;
wherein at least one of the first collapsible side wall and the second collapsible side wall is configured to open in an upward and outward direction; and
wherein the at least one of the first collapsible side wall and the second collapsible side wall are configured to slide into an animal containment area after opening.

9. The collapsible crate assembly of claim 8, wherein, in the deployed position, the top is coupled to the collapsible front wall and the collapsible rear wall.

10. The collapsible crate assembly of claim 8, wherein the collapsible front wall and the collapsible rear wall are each coupleable to the bottom using a respective locking mechanism.

11. The collapsible crate assembly of claim 10, wherein the respective locking mechanism comprises a two-position switch, wherein a locked position of the two-position switch engages a portion of the respective locking mechanism with the respective collapsible front wall or collapsible rear wall, and wherein an unlocked position of the two-position switch permits the removal of the respective collapsible front wall or collapsible rear wall from the bottom.

12. The collapsible crate assembly of claim 8, wherein the first collapsible side wall and the second collapsible side wall comprise at least one latch pin release mechanism arranged in at least one corner of the first collapsible side wall and the second collapsible side wall, wherein the at least one latch pin release mechanism is coupleable to at least one of the collapsible front wall or the collapsible rear wall.

13. A collapsible crate assembly, comprising:
a bottom, a top, a first side wall, a second side wall, a front wall, and a rear wall;
a first vertical member, a second vertical member, a third vertical member, and a fourth vertical member; and
a moving mechanism engageable with the top, the first vertical member, the second vertical member, the third vertical member, and the fourth vertical member and configured to facilitate moving the top between a deployed position and a collapsed position.

14. The collapsible crate assembly of claim 13, further comprising a handle movable between a locked position and an unlocked position, and wherein in the unlocked position the top is movable between the deployed position and the collapsed position.

15. The collapsible crate assembly of claim 14, wherein the moving mechanism comprises rollers configured to engage and travel in tracks arranged on the first vertical member, the second vertical member, the third vertical member, and the fourth vertical member.

16. The collapsible crate assembly of claim 13, wherein the first side wall and the second side wall are configured to open from a bottom of the first side wall and the second side wall upward and are configured to slide into the collapsible crate assembly after opening.

17. The collapsible crate assembly of claim 13, wherein the first vertical member, the second vertical member, the third vertical member, and the fourth vertical member are each coupleable to the bottom using a respective locking mechanism, wherein a locked position of the respective locking mechanism engages a portion of the respective locking mechanism with the respective first vertical member, second vertical member, third vertical member, or fourth vertical member, and wherein an unlocked position of the respective locking mechanism permits removal of the respective first vertical member, second vertical member, third vertical member or fourth vertical member from the bottom.

18. The collapsible crate assembly of claim 17, wherein the respective locking mechanism comprises a two-position switch.

* * * * *